Patented Nov. 27, 1923.

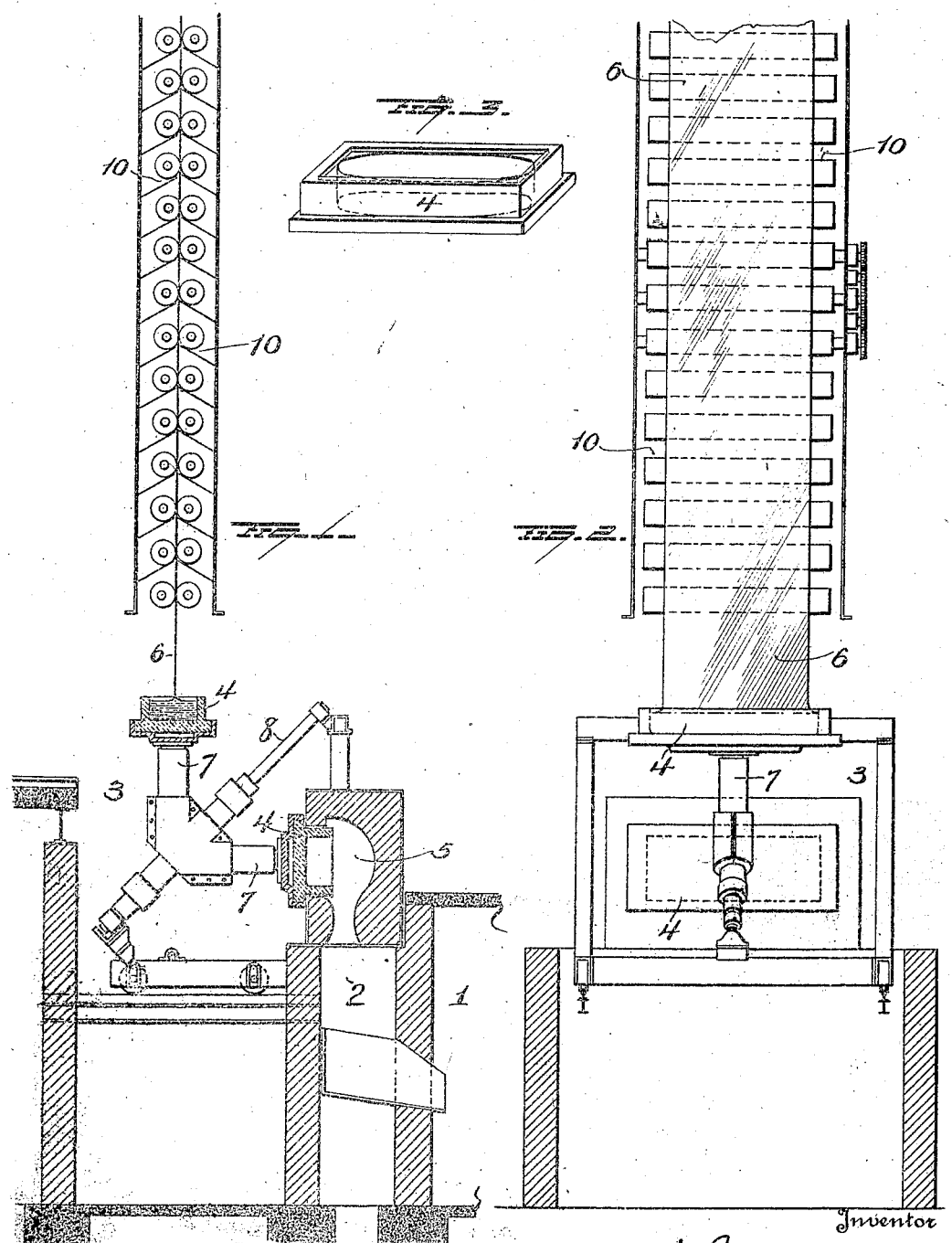

1,475,527

UNITED STATES PATENT OFFICE.

HUGO J. WALTER, OF BRADFORD, PENNSYLVANIA, ASSIGNOR TO INTERSTATE WIN-
DOW GLASS COMPANY, OF BRADFORD, PENNSYLVANIA.

ART OF DRAWING GLASS.

Application filed December 7, 1922. Serial No. 605,487.

*To all whom it may concern:*

Be it known that I, HUGO J. WALTER, a citizen of the United States, and a resident of Bradford, in the county of McKean and State of Pennsylvania, have invented certain new and useful Improvements in the Art of Drawing Glass; and I do hereby declare the following to be a full, clear, and exact description of the invention, such as will enable others skilled in the art to which it appertains to make and use the same.

My invention relates to the art of drawing glass and its object is to produce a glass sheet of indefinite length and of good quality which may be cut subsequently into plates of any desired size. Another object of the invention is to provide a method of drawing glass which is commercially practical and which may be performed as a continuous operation to produce a glass sheet of indeterminate length but will avoid the necessity of flowing the glass continuously from a melting tank or furnace to a drawing pot.

My invention may be successfully practiced by the use of machinery having the general characteristics of that illustrated in the accompanying drawings in which Figure 1 is a sectional elevation of a portion of a glass-melting tank or furnace associated with a drawing and annealing mechanism which is shown in a more or less conventional manner.

Figure 2 is a view taken at a right angle to Fig. 1;

Figure 3 is a detail perspective view of a drawing pot which may be used.

The furnace or tank 1 is so constructed as to provide a return drain chamber 2 and a pot chamber 3 in which one or more pots 4 are accommodated together with means for shifting between the drain passage 5 and the drawing position 6. In the illustrated arrangement, the pots are fixed upon the outer ends of arms 7 which are at a right angle to each other and are fixed upon a shaft 8 disposed within the chamber 3 at an angle of 45 degrees. Said shaft is supported in suitable bearings on the floor of the chamber 3 and on the roof portion 9 of the furnace or kiln, respectively, and it may be rotated by any convenient mechanism. It will be readily noted that rotating the shaft through one-half a revolution will carry a pot-carrying arm from a horizontal to a vertical position, and vice versa and in the horizontal position of the arm the pot thereon will be disposed in the opening of the drain passage 5 while in the vertical position of the arm the pot will be horizontal and below the drawing and annealing apparatus 10.

Assuming that no glass has, as yet, been drawn, glass is ladled or run into the pot which is at the drawing-point 6 and the apparatus 10 is lowered until the usual bait is brought into contact with the surface of the glass in the pot. The apparatus is then operated to draw the glass from the pot in a sheet, and it will be noted, on reference to Figure 3, that the pot is elliptical or oblong in form so that the glass may readily assume a sheet form. After all the glass has been drawn from the pot, except such small residue as experience or circumstances may determine to be necessary or advisable, the drawing operation is stopped and the drawn sheet is cut, burnt or otherwise severed as close as possible to the pot. The apparatus 10 is then raised as an entirety until the lower end of the sheet is clear of the pot, whereupon the shaft 8 is rotated so that the pot will be carried to the draining position, the same action carrying to the drawing position the pot which had been draining and heating. The pot brought to the draining position will be exposed to the heat from the tank or furnace and the small residue of glass left therein will melt and drain back into the furnace. In the mean while, however, glass will be ladled or run into the pot which was brought to the drawing point after which the drawing and annealing apparatus 10 is lowered until the lower end of the previously drawn sheet or section enters the bath of glass in the pot. The end of the sheet welds with the glass in the pot and the machinery is then operated to give a vertical movement to the sheet and draw the glass from the pot, the cycle of operations being repeated indefinitely. After passing up through the machine, the glass is cut into desired lengths by any well-known method.

It will be readily seen that by my method the glass is drawn in relatively short sections but a continuous integral sheet of indefinite length is produced, each section serving as a bait for the succeeding section and forming a welded union therewith. The pot from which the glass is to be drawn is supplied with a relatively small charge which will easily remain at the proper temperature during the drawing operation, and the finished product will be a homogeneous sheet free of wrinkles or similar defects.

Having fully described my invention what I claim as new and desire to secure by Letters Patent, is:—

1. The improvement in the art of drawing glass which consists in drawing a series of sheets and welding each sheet to the succeeding sheet during the drawing operation.

2. The improvement in the art of drawing glass sheets which consists in drawing a plurality of sections in interrupted succession, each section forming the bait for a succeeding section.

3. The improvement in the art of drawing glass sheets which consists in providing a plurality of charges of molten glass, and drawing sheets in interrupted succession from the several charges, each sheet being welded to the preceding sheet.

4. The improvement in the art of drawing glass sheets which consists in presenting charges of molten glass successively to a drawing apparatus, drawing a sheet from each charge of glass, and causing each sheet drawn to serve as a bait for the succeeding sheet whereby the successive sheets will be welded together.

5. The improvement in the art of drawing glass sheets which consists in drawing sections successively from a series of charges, welding each section to the preceding section during the drawing operation, and annealing the drawn sections simultaneously with the drawing of succeeding sections.

In testimony whereof, I have signed this specification in the presence of two subscribing witnesses.

HUGO J. WALTER.

Witnesses:
F. D. GALLUP,
L. E. STEWART.